United States Patent
Trecker et al.

(10) Patent No.: US 6,835,404 B2
(45) Date of Patent: Dec. 28, 2004

(54) MANUFACTURE OF NON-STANDARD CHEESE PRODUCTS

(75) Inventors: Gary William Trecker, McHenry, IL (US); Daniel Andrew Meyer, Park Ridge, IL (US); Larry Edward Woodford, Collierville, TN (US); Amna Munji Abboud, Germantown, TN (US)

(73) Assignee: Kraft Foods Holdings, Inc., Northfield, IL (US)

( * ) Notice: Subject to any disclaimer, the term of this patent is extended or adjusted under 35 U.S.C. 154(b) by 201 days.

(21) Appl. No.: 10/006,979

(22) Filed: Dec. 5, 2001

(65) Prior Publication Data

US 2003/0104106 A1 Jun. 5, 2003

(51) Int. Cl.$^7$ .............................................. A23C 19/00
(52) U.S. Cl. .......................... 426/582; 426/39; 426/580
(58) Field of Search ........................... 426/36, 39, 580, 426/582, 519, 520

(56) References Cited

U.S. PATENT DOCUMENTS 5,061,504 A * 10/1991 Kong-Chan et al. ........ 426/582
6,475,545 B2 * 11/2002 Borwankar et al. ......... 426/334
6,558,716 B1 * 5/2003 Kent et al. .................... 426/36

* cited by examiner

Primary Examiner—Leslie Wong
(74) Attorney, Agent, or Firm—Fitch, Even, Tabin & Flannery

(57) ABSTRACT

The present invention is directed to non-standard cheese products and their methods of manufacture. More particularly, this invention is directed to the manufacture of cheese products by blending a cheese analog or a cream cheese substitute, a standard cheese having the desired flavor profile, and an acidified dairy slurry. The non-standard cheese products of the present invention have functional and organoleptic properties similar to standard cheese products in spite of reduced levels of cholesterol and saturated fats. The non-standard cheese products of the present invention are soft and easily blended with other food ingredients, making them ideally suited for use as ingredients in industrial food applications (e.g., baked products, dessert fillings, icings, and the like). Especially preferred non-standard cheese products of this invention include soft cheeses such as, for example, cream cheese and Neufchatel cheese.

20 Claims, 3 Drawing Sheets

MANUFACTURE OF NON-STANDARD CHEESE PRODUCTS

FIELD OF THE INVENTION

The present invention is directed to non-standard cheese products and their methods of manufacture. More particularly, this invention is directed to the manufacture of non-standard cheese products by blending a cheese analog or a cream cheese substitute, a standard cheese having the desired flavor profile, and an acidified dairy slurry. The non-standard cheese products of the present invention have functional and organoleptic properties similar to standard cheese products in spite of reduced levels of cholesterol and saturated fats. The non-standard cheese products of the present invention are soft and easily blended with other food ingredients, making them ideally suited for use as ingredients in industrial food applications (e.g., baked products, dessert fillings, icings, and the like). Especially preferred non-standard cheese products of this invention include soft cheeses such as, for example, cream cheese and Neufchatel cheese.

BACKGROUND OF THE INVENTION

Cheese products, especially soft cheeses such as cream cheese and Neufchatel cheese, are often used in the manufacture of industrial food products (e.g., baked products, dessert fillings, icings, and the like). Ideally, such cheese products provide the taste and texture of natural cheese without adversely effecting the organoleptic and other properties of the processed food products into which they are incorporated. Such cheeses are preferably low cost and have reduced levels of cholesterol and saturated fat.

Mixtures of cheese analogs or cream cheese substitutes and natural cheeses have been used in such applications. Typically such mixtures contain about 40 to about 80 percent cheese analogs or cream cheese substitutes and about 20 to about 60 percent natural cheese, wherein the natural cheese is selected to provide the desired flavor profile. Unfortunately such cheese products are often difficult to incorporate into conventional food processing or manufacturing lines (i.e., too firm) and/or to blend with other ingredients due to their relatively high viscosities (i.e., too firm). Attempts to produce a soft, functional, and blendable mixture have generally resulted in inferior products which gave less than desirable properties in the food products into which they were intended to be incorporated.

It would be desirable, therefore, to provide a cheese product comprising a mixture of a cheese analog or cream cheese substitute and a natural cheese which is soft and easily blended with other food ingredients for use in the manufacture of industrial food products. It also would be desirable to provide such a soft and blendable cheese product which can be used to prepare industrial food products having excellent organoleptic and other properties. The present invention provides such cheese products and methods for the manufacture of such cheese products.

SUMMARY OF THE INVENTION

The present invention is directed to non-standard cheese products and their methods of manufacture. More particularly, this invention is directed to the manufacture of non-standard cheese products by blending a cheese analog or cream cheese substitute, standard cheese having the desired flavor profile, and an acidified dairy slurry. The non-standard cheese products of the present invention have functional and organoleptic properties similar to standard cheese products in spite of reduced levels of cholesterol and saturated fats. The non-standard cheese products of the present invention are soft and easily blended with other food ingredients, making them ideally suited for use as ingredients in industrial food applications (e.g., baked products, dessert fillings, icings, and the like). Especially preferred non-standard cheese products of this invention include soft cheeses such as, for example, cream cheese and Neufchatel cheese.

The non-standard cheese products of the present invention are prepared by blending about 30 to about 80 percent cheese analogs or cream cheese substitutes, about 20 to 50 about percent natural cheese, and about 5 to about 50 acidified dairy slurry. More preferably, the non-standard cheese products of the present invention are prepared by blending about 45 to about 65 percent cheese analogs or cream cheese substitutes, about 25 to 35 about percent natural cheese, and about 10 to about 25 percent acidified dairy slurry.

The present invention is related to a non-standard cheese product comprising about 30 to about 80 percent cheese analogs or cream cheese substitutes, about 20 to 50 about percent natural cheese, and about 5 to about 50 acidified dairy slurry, wherein the non-standard cheese product is soft and easily blendable with conventional food ingredients in a food processing and manufacturing line. One especially preferred non-standard cheese product of the present invention includes non-standard soft cream cheese comprising about 55 to about 65 percent cheese analogs or cream cheese substitutes, about 20 to 30 about percent natural cheese, and about 10 to about 20 percent acidified dairy slurry, wherein the non-standard cream cheese product is soft and easily blendable with conventional food ingredients in a food processing and manufacturing line and wherein the acidified dairy slurry is prepared by cooking a mixture comprising at least one dairy protein, salt, gum, at least one edible acid, and water. Another especially preferred non-standard cheese product of the present invention includes non-standard Neufchatel cheese comprising about 45 to about 55 percent cheese analogs or cream cheese substitutes, about 25 to 35 about percent Neufchatel cheese, and about 15 to about 25 acidified dairy slurry, wherein the non-standard Neufchatel cheese product is soft and easily blendable with conventional food ingredients in a food processing and manufacturing line and wherein the acidified dairy slurry is prepared by cooking a mixture comprising a dairy protein, salt, gum, at least one edible acid, and water.

The present invention also relates to a method for preparing a non-standard cheese product, said method comprising (1) cooking a mixture comprising a dairy protein, salt, gum, at least one edible acid, and water to a temperature of about 165 to about 190° F. to form an acidified dairy slurry, (2) forming a mixture of about 30 to about 80 percent cheese analog or cream cheese substitute, about 20 to about 50 percent cream cheese, and about 5 to about 50 percent acidified dairy slurry, and (3) blending the mixture for a time sufficient to form the non-standard cheese product, wherein the non-standard cheese product is soft and easily blendable with conventional food ingredients in a food processing and manufacturing line.

DETAILS OF THE INVENTION

The non-standard cheese products of the present invention are prepared by blending about 30 to about 80 percent cheese analogs or cream cheese substitutes, about 20 to about 50 percent natural cheese, and about 5 to about 50 percent acidified dairy slurry. More preferably, the non-standard cheese products of the present invention are prepared by blending about 45 to about 65 percent cheese analogs or cream cheese substitutes, about 25 to about 35 percent natural cheese, and about 10 to about 25 percent acidified dairy slurry. The non-standard cheese products of this invention are soft and easily blendable with conventional food ingredients in a food processing and manufacturing line. For purposes of this invention, "soft" as applied to the non-standard cheese products of this invention relates to a product which is pumpable in conventional food processing lines; such a "soft" product will generally have a texture of about 1000 to about 5000 g, and more preferably of about 2500 to about 4000 g, at about 40° F. For purposes of this invention, "easily blendable with conventional food ingredients" is intended to mean that the non-standard cheese products can be easily mixed with other food ingredients using standard mixing devices or techniques normally used in convention food processing lines; generally, such mixing involves low or moderate shear.

The acidified dairy slurry is prepared by cooking a mixture comprising a dairy protein, salt, gum, at least one edible acid, and water at a temperature of about 165 to about 190° F. for about 8 to about 12 minutes. The cooking step helps to activate the gum and to blend the various ingredients; it may also serve as a pasteurization step. If desired, the acidified dairy slurry can be homogenized after cooking. Suitable dairy proteins can be derived, for example, from sweet cream, milk protein concentrate, non-fat dry milk, and the like. Suitable gums include, for example, carob bean gum, guar gum, xanthan gum, and the like. Suitable edible acids include, for example, lactic acid, acetic acid, citric acid, phosphoric acid, and the like. Generally, the acidified dairy slurry contains about 5 to about 95 percent dairy protein source, about 0.5 to about 2.5 percent salt, about 0.2 to about 0.7 percent gum, and about 0.1 to about 1.1 percent edible acid with a total water content of about 45 to about 85 percent. More preferably, the acidified dairy slurry contains about 15 to about 80 percent dairy protein source, about 0.95 to about 1.45 percent salt, about 0.2 to about 0.6 percent gum, and about 0.3 to about 0.75 percent edible acid with a total water content of about 50 to about 65 percent. Generally, the acidified dairy slurry has a pH of about 4.5 to about 5.1. The water content of the acidified dairy slurry can be varied as needed to obtain the desired viscosity or firmness of the resulting non-standard cheese product. Water may be derived from the other components and/or added directly.

Figure 1:
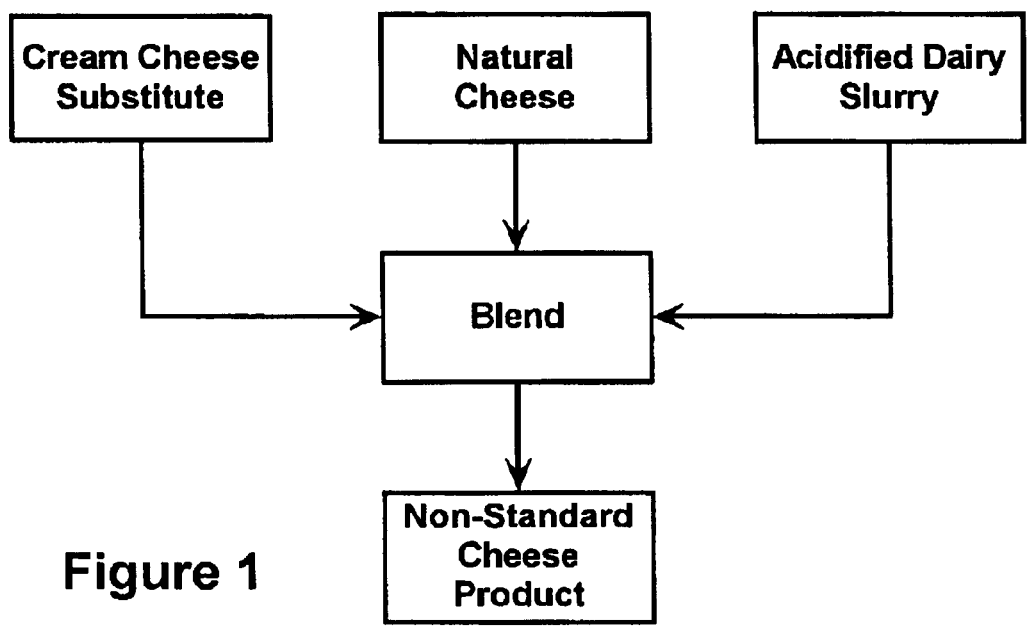
FIG. 1 is a general schematic diagram of the process of the invention.

The non-standard cheese products of the present invention are prepared by blending about 5 to about 50 percent acidified dairy slurry, about 30 to about 80 percent cream cheese substitute, and about 20 to about 50 percent standard cheese as illustrated in FIG. 1. If desired, the non-standard cheese products of this invention may be homogenized after the blending step. Preferably the non-standard cheese products of the present invention contain about 10 to about 40 percent fat, about 50 to about 75 percent moisture, and have a texture of about 1000 to about 5000 g at about 40° F. More preferably, the non-standard cream cheese products of the present invention contain about 25 to about 40 percent fat, about 50 to about 60 percent moisture, and have a texture of about 2500 to about 4000 g at about 40° F.; even more preferably, the non-standard cream cheese products of the present invention have target fat and moisture levels of about 34.5 and 54.5 percent, respectively. More preferably, the non-standard Neufchatel cheese products of the present invention contain about 17 to about 25 percent fat, about 60 to about 70 percent moisture, and have a texture of about 1000 to about 3000 g at about 40° F.; even more preferably, the non-standard Neufchatel cheese products of the present invention have target fat and moisture levels of about 24 and 62 percent, respectively.

Figure 2:
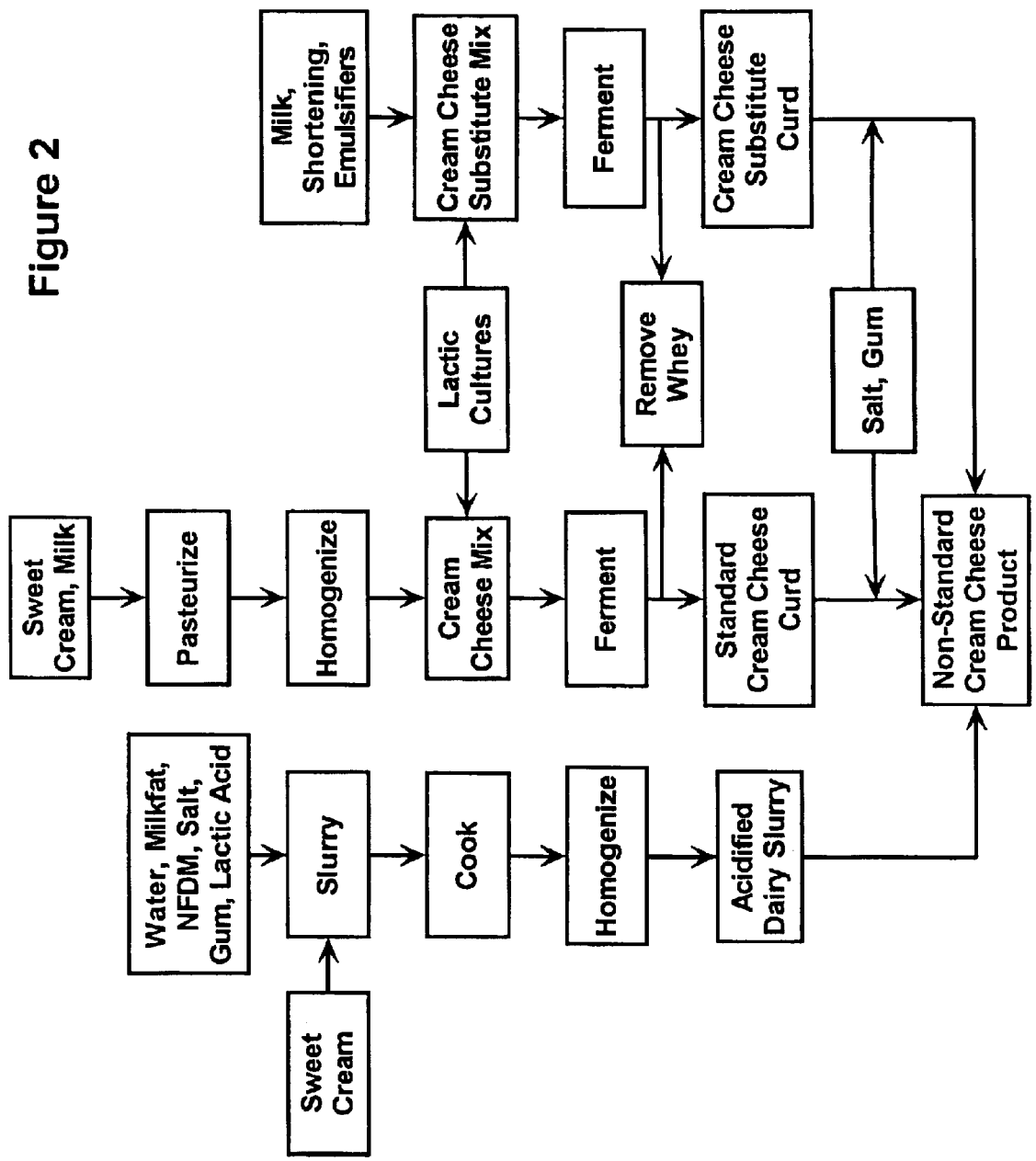
FIG. 2 is a detailed schematic diagram of a process of the invention for preparing non-standard cream cheese.
Figure 3:
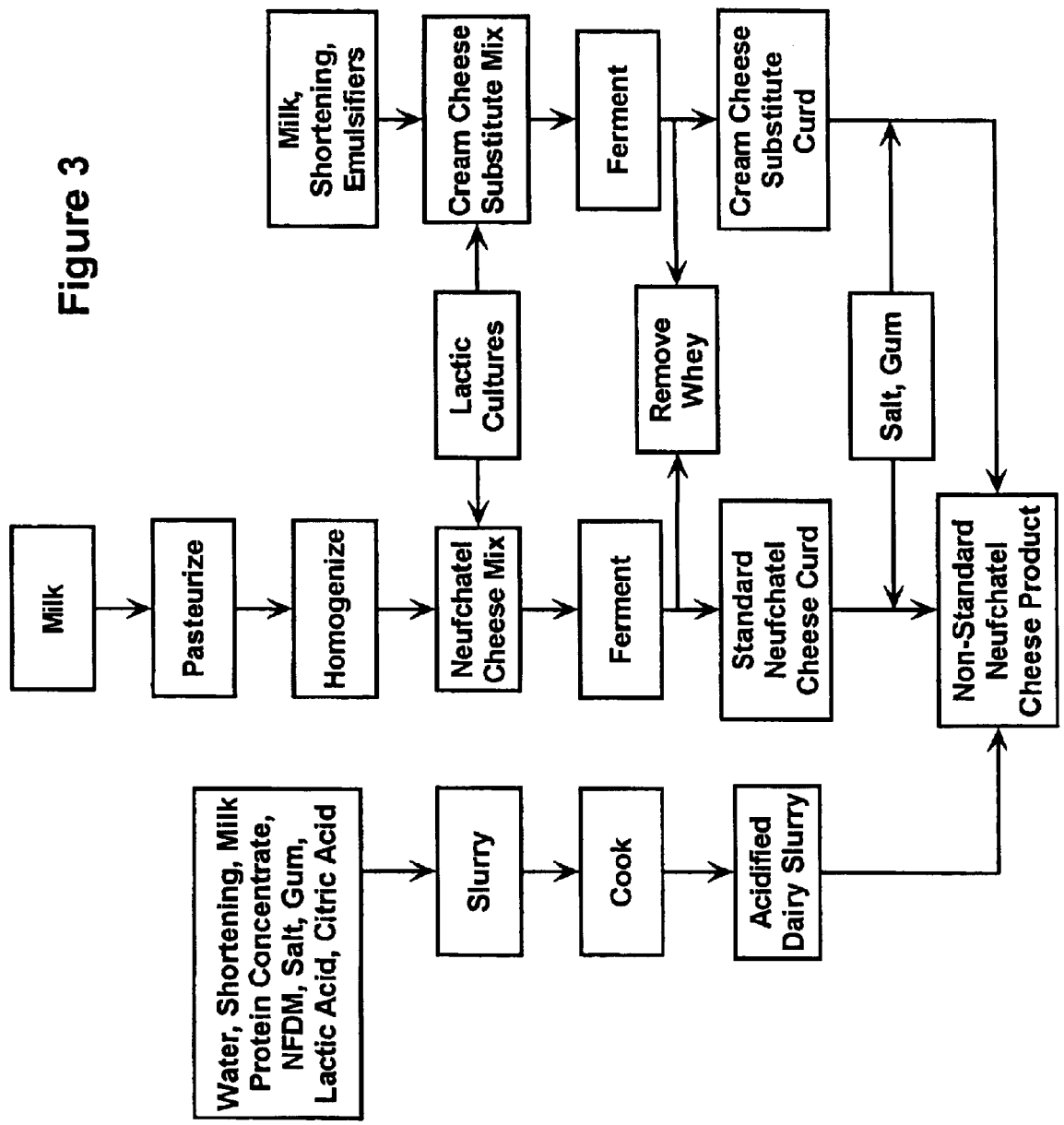
FIG. 3 is a detailed schematic diagram of a process of the invention for preparing non-standard Neufchatel cheese.

The cream cheese substitutes for use in the present invention generally contain about 25 to about 40 percent fat and about 50 to about 60 percent moisture; more preferably the cream cheese substitutes for use in this invention contain about 33 to about 36 percent fat and about 52 to about 55 percent moisture (i.e., similar levels as for natural cream cheese) but less than about 10 percent milkfat. According to this invention, a cream cheese substitute is a product which resembles real cream cheese, but contains at least 20 percent partially-hydrogenated vegetable oil and less than 10% milk fat. One especially preferred cream cheese substitute is Kraft Cheezkake Blend™ from Kraft Food Ingredients (Memphis, Tenn.). The cream cheese substitutes used in the present invention can be prepared, for example, using standard cream cheese production techniques and typically contain milk, partially hydrogenated vegetable oil (e.g., soybean oil), cheese culture, salt, carob bean gum, mono- and diglycerides, vitamin A palmitate, and color. Generally methods suitable for preparing such cream cheese substitutes are illustrated in FIGS. 2 and 3.

The standard cheeses used to prepare the non-standard cheese products of this invention include, for example, cream cheese, Neufchatel cheese, and other soft-styled cheeses. The standard cheeses can be prepared using conventional techniques well known in the art. General methods suitable for preparing standard cream cheese and Neufchatel cheese are illustrated in FIGS. 2 and 3, respectively. The standard cheese is generally used to provide the desired flavor profile.

The following examples are provided to illustrate the invention and not to limit it. Unless otherwise indicated, all percentages and ratios are by weight.

EXAMPLE 1

This example illustrates the preparation of an acidified dairy slurry for use in the present invention in order to prepare a low-cost replacement for cream cheese. A slurry was prepared by blending a mixture consisting essentially of about 70.7 percent sweet cream, about 6.5 percent anhydrous milkfat, about 5.35 percent non-fat dry milk, about 1 percent salt, about 0.35 percent gum, about 0.4 percent lactic acid, and about 15.7 percent water. The slurry was then cooked at about 185° F. for about 8 minutes and then homogenized at about 4500 psi to form the acidified dairy slurry. The acidified dairy slurry had a pH of about 4.9 and contained about 54.4 percent moisture and about 34.5 percent fat.

EXAMPLE 2

This example illustrates the preparation of a non-standard cream cheese using the acidified dairy slurry of Example 1.

A mixture consisting essentially of about 15 percent of the acidified acid slurry of Example 1, about 59.5 percent of a cream cheese substitute (i.e., Kraft Cheezkake Blend™ from Kraft Food Ingredients, Memphis, Tenn.), and about 25.5 percent standard soft cream cheese were blended together to form a homogenous non-standard cream cheese containing about 54.5 percent moisture and about 34.5 percent fat. The non-standard cream cheese could then be packaged and refrigerated for later use. The non-standard cream cheese was ideally suited as an ingredient in industrial food applications and products.

EXAMPLE 3

The non-standard cream cheese of Example 2 (inventive composition) was compared with standard soft cream cheese (control #1) and a 70/30 blend of cream cheese substitute and standard cream cheese (control #2). The cream cheese substitute and standard soft cream cheese used in control #2 were the same as used in Example 2.

All samples were tempered overnight at refrigeration temperature. Texture was determined using 2×2×2 inch samples with a Ta-XT2 Texture Analyzer with a TA-4 probe (Texture Technologies Corp., Scarsdale, N.Y.). Yield stress was measured using a Haake viscometer with a plate and a PP-20 probe with a 1 mm gap (Thermo Haake, Paramus, N.J.); samples were cooled to abut 37° F. before testing and about 300 data points were obtained. The viscosity of a cheesecake batter prepared using the inventive and control samples as the cream cheese source was also determined. Yield stress is the stress that must be applied before a material will flow and is often used to measure cream cheese spreadability. The following results were obtained.

| Sample | Texture (g) | Yield Stress (Pa) | Cheesecake Batter Viscosity (cP) |
|---|---|---|---|
| Control #1 | 3597 | 6891 | 1149 |
| Control #2 | 9380 | 15,124 | 3492 |
| Inventive | 3621 | 8565 | 1468 |

Control #2 (cream cheese substitute and cream cheese blend) was very firm with very high texture, high yield stress, and high batter viscosity as compare to control #1 (cream cheese) and the inventive sample. The inventive sample had a texture, yield stress, and batter viscosity close to that of standard soft cream cheese.

Using the cheesecake batters containing the various cream cheese ingredients, several cheesecakes were prepared and evaluated. No major differences were observed in baking properties of the various batters; none of the cheesecake cracked. The texture of the cheesecake prepared using the inventive composition was softer than the cheesecake contained control #2 and was similar to the cheesecake prepared using cream cheese (control #1) as indicated in the following table.

| | Cheesecake Texture (g) | | |
|---|---|---|---|
| Sample | Outside | Middle | Center |
| Control #1 | 94 | 80 | 65 |
| Control #2 | 135 | 127 | 67 |
| Inventive | 90 | 78 | 60 |

The texture of the cheesecake prepared with the inventive non-standard cream cheese was smoother and creamier than the one prepared with control #1 and was very similar to the one prepared with standard soft cream cheese (control #2).

EXAMPLE 4

This example illustrates the preparation of an acidified dairy slurry for use in the present invention in order to prepare a low-cost replacement for Neufchatel cheese. A slurry was prepared by blending a mixture consisting essentially of about 4.8 percent shortening (partially hydrogenated soybean oil), about 9.9 percent milk protein concentrate, about 6.5 percent non-fat dry milk, about 1.4 percent salt, about 0.5 percent gum, about 0.9 percent lactic acid, about 0.2 percent citric acid, and about 75.6 water. The slurry was then cooked at about 185° F. for about 8 minutes, and then cooled to about 5° F. to form the acidified dairy slurry. The acidified dairy slurry had a pH of about 4.9 and contained about 76.7 percent moisture and about 4.9 percent fat.

EXAMPLE 5

This example illustrates the preparation of a non-standard Neufchatel cheese using the acidified dairy slurry of Example 1. A mixture consisting essentially of about 22 percent of the acidified acid slurry of Example 4, about 48 percent of a cream cheese substitute (i.e., Kraft Cheezkake Blend™ from Kraft Food Ingredients, Memphis, Tenn.), and about 30 percent standard Neufchatel cheese were blended together and then homogenized at about 1200 psi to form a homogenous non-standard Neufchatel cheese containing about 62 percent moisture and about 24 percent fat. The non-standard Neufchatel cheese could then be packaged and refrigerated for later use.

Using the same techniques as in Example 1, the following parameters were determined for the inventive non-standard Neufchatel cheese and a control Neufchatel cheese as well as a Danish filling composition prepared with the two cheese products.

| Sample | Texture (g) | Yield Stress (Pa) | Danish Filling Viscosity (cP) |
|---|---|---|---|
| Control | 2407 | 6215 | 13,140 |
| Inventive | 2150 | 4101 | 15,380 |

The non-standard Neufchatel cheese is ideally suited as an ingredient in industrial food applications and products.

Comparative Example

This comparative example illustrates various, unsuccessful attempts to provide soft, functional, and blendable cream cheese compositions using standard blends of about 70 percent cream cheese substitute (i.e., Kraft Cheezkake Blend™) and about 30 percent cream cheese. The following attempts were made:

Increased moisture content of 70/30 blend to about 59 percent using higher moisture cream cheese substitute: firmness of 70/30 blend was not decreased.

Increased amount of cream cheese substitute to provide about 59 percent moisture content: firmness not decreased; product cracked and underwent syneresis during storage; dry texture with cultured flavor lacking.

Added lecithin to the 70/30 blend at levels of about 0.1, about 0.3, and about 0.5 percent; firmness not decreased.

Modified pH of 70/30 blend by adding disodium phosphate, sodium hydroxide, and/or citric acid: resulting cheese cake batter was too thin.

Added carob bean gum to the 70/30 blend having modified pH at levels of about 0.08, about 0.1, and about 0.15 percent: did not provide desired thickness with higher pH.

Added about 0.2 percent monoglyceride to 70/30 blend: slight decrease in firmness was not sufficient to provide improved handling in industrial food applications.

Employed fast cooling of 70/30 blend: decreased firmness but resulted in microbiological defects.

Employed cream cheese substitute prepared using liquid soybean oil rather than partially hydrogenated soybean oil): provided very soft texture relative to regular cream cheese; cheesecake batter prepared using cream cheese substitute was very thin and runny; cheesecakes prepared using such batter had an undesirable oily aftertaste.

Increased overall fat content of 70/30 blend: firmness decreased only slightly.

Homogenized 70/30 blend: smoother product but with increased firmness was obtained.

Varied homogenization pressure in preparing cream cheese substitute in 70/30 blend: firmness of final product not changed.

What is claimed is:

1. A non-standard cheese product comprising about 30 to about 80 percent cheese substitute, about 20 to about 50 percent natural cheese, and about 5 to about 50 acidified dairy slurry, wherein the non-standard cheese product is soft and easily blendable with conventional food ingredients in a food processing and manufacturing line and wherein the natural cheese is cream cheese or Neufchatel cheese.

2. The non-standard cheese product as defined in claim 1, and wherein the non-standard cheese product has a texture of about 1000 to about 5000 g at about 40° F.

3. The non-standard cheese product as defined in claim 2, wherein the natural cheese is cream cheese.

4. The non-standard cheese product as defined in claim 2, wherein the natural cheese is Neufchatel cheese.

5. The non-standard cheese product as defined in claim 3, wherein the acidified dairy slurry is prepared by cooking a mixture comprising a daily protein, salt, gum, at least one edible acid, and water at a temperature of about 165 to about 195° F. for about 8 to about 12 minutes.

6. The non-standard cheese product as defined in claim 4, wherein the acidified dairy slurry is prepared by cooking a mixture comprising a dairy protein, salt, gum, at least one edible acid, and water at a temperature of about 165 to about 195° F. for about 8 to about 12 minutes.

7. The non-standard cheese product as defined in claim 2, wherein the acidified dairy slurry is homogenized.

8. The non-standard cheese product as defined in claim 5, wherein the acidified dairy slurry is homogenized after cooking.

9. The non-standard cheese product as defined in claim 6, wherein the acidified dairy slurry is homogenized after cooking.

10. A method for preparing a non-standard cheese product, said method comprising (1) cooking a first mixture comprising a dairy protein, salt, gum, at least one edible acid, and water to a temperature of about 165 to about 195° F. to form an acidified dairy slurry, (2) forming a second mixture comprising about 30 to about 80 percent cheese analog or cream cheese substitute, about 20 to 50 about percent natural cheese, and about 5 to about 50 acidified dairy slurry, and (3) blending the second mixture for a time sufficient to form the non-standard cheese product, wherein the non-standard cheese product is soft and easily blendable with conventional food ingredients in a food processing and manufacturing line and wherein the natural cheese is cream cheese or Neufchatel cheese.

11. The method as defined din claim 10, wherein the non-standard cheese product is homogenized.

12. The method as defined in claim 10, wherein the non-standard cheese product has a texture of about 1000 to about 5000 g at about 40° F.

13. The method as defined in claim 12, wherein the natural cheese is cream cheese.

14. The method as defined in claim 12, wherein the natural cheese is Neufchatel.

15. The method as defined in claim 13, wherein the first mixture comprises about 5 to about 95 percent of a dairy protein source containing the dairy protein, about 0.5 to about 2.5 percent of the salt, about 0.2 to about 0.7 percent of the gum, about 0.1 to about 1.1 percent of the at least one edible acid, and a total water content of about 45 to about 85 percent.

16. The method as defined in claim 14, wherein the first mixture comprises about 5 to about 95 percent of a dairy protein source containing the dairy protein, about 0.5 to about 2.5 percent of the salt, about 0.2 to about 0.7 percent of the gum, about 0.1 to about 1.1 percent of the at least one edible acid, and a total water content of about 45 to about 85 percent.

17. The method as defined in claim 15, wherein the first mixture comprises about 15 to about 85 percent of the dairy protein source containing the dairy protein, about 0.95 to about 1.45 percent of the salt, about 0.2 to about 0.6 percent of the gum, about 0.3 to about 0.75 percent of the at least one edible acid, and total water content of about 45 to about 65 percent.

18. The method as defined in claim 15, wherein the first mixture comprises about 15 to about 85 percent of the dairy protein source containing the dairy protein, about 0.95 to about 1.45 percent of the salt, about 0.2 to about 0.6 percent of the gum, about 0.3 to about 0.75 percent of the at least one edible acid, and total water content of about 45 to about 65 percent.

19. The method as defined in claim 17, wherein the second mixture comprises about 45 to about 65 percent cheese analog or cream cheese substitute, about 25 to 35 about percent natural cheese, and about 10 to about 25 acidified dairy slurry.

20. The method as defined in claim 18, wherein the second mixture comprises about 45 to about 65 percent cheese analog or cream cheese substitute, about 25 to 35 about percent natural cheese, and about 10 to about 25 acidified dairy slurry.

* * * * *

UNITED STATES PATENT AND TRADEMARK OFFICE
CERTIFICATE OF CORRECTION

PATENT NO. : 6,835,404 B2
DATED : December 28, 2004
INVENTOR(S) : Trecker et al.

It is certified that error appears in the above-identified patent and that said Letters Patent is hereby corrected as shown below:

Column 7,
Line 40, delete "daily" and insert -- dairy --.

Column 8,
Line 3, delete "50 about" and insert -- about 50 --.
Line 11, delete "din" and insert -- in --.
Lines 50-51, delete "35 about" and insert -- about 35 --.
Lines 55-56, delete "35 about" and insert -- about 35 --.

Signed and Sealed this

Seventh Day of June, 2005

JON W. DUDAS
*Director of the United States Patent and Trademark Office*